(12) United States Patent
Lupescu et al.

(10) Patent No.: US 8,375,701 B2
(45) Date of Patent: Feb. 19, 2013

(54) HYDROCARBON RETAINING AND PURGING SYSTEM

(75) Inventors: Jason Aaron Lupescu, Ypsilanti, MI (US); Shane Elwart, Ypsilanti, MI (US); James Michael Kerns, Trenton, MI (US); Michael James Uhrich, West Bloomfield, MI (US); Harendra S. Gandhi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 700 days.

(21) Appl. No.: 12/182,777

(22) Filed: Jul. 30, 2008

(65) Prior Publication Data
US 2010/0024396 A1 Feb. 4, 2010

(51) Int. Cl.
*F02M 25/06* (2006.01)
(52) U.S. Cl. ............... 60/279; 60/283; 60/284
(58) Field of Classification Search .......... 60/279, 60/283, 284, 278
See application file for complete search history.

(56) References Cited

U.S. PATENT DOCUMENTS

| | | | |
|---|---|---|---|
| 3,757,521 A | 9/1973 | Tourtellotte et al. | |
| 4,985,210 A | 1/1991 | Minami | |
| 5,207,734 A | 5/1993 | Day et al. | |
| 5,239,824 A | 8/1993 | Matsumoto | |
| 5,239,972 A | 8/1993 | Takeyama et al. | |
| 5,272,873 A | 12/1993 | Hamazaki | |
| 5,417,947 A | 5/1995 | Hertl et al. | |
| 5,524,433 A * | 6/1996 | Adamczyk et al. | 60/276 |
| 5,946,906 A * | 9/1999 | Akazaki et al. | 60/278 |
| 6,000,217 A * | 12/1999 | Hochmuth | 60/274 |
| 6,122,908 A | 9/2000 | Wirmark | |
| 6,167,696 B1 | 1/2001 | Maaseidvaag et al. | |
| 6,477,831 B1 | 11/2002 | Ballinger et al. | |
| 6,729,129 B2 | 5/2004 | Yamamoto et al. | |
| 2002/0053202 A1 | 5/2002 | Akama et al. | |
| 2003/0046924 A1* | 3/2003 | Iihoshi et al. | 60/277 |
| 2005/0172614 A1 | 8/2005 | Tamura et al. | |
| 2006/0213187 A1 | 9/2006 | Kupe et al. | |
| 2007/0186910 A1* | 8/2007 | Leone et al. | 123/520 |

(Continued)

FOREIGN PATENT DOCUMENTS

| | | |
|---|---|---|
| EP | 0116456 | 5/1988 |
| EP | 0179870 | 1/1990 |

(Continued)

OTHER PUBLICATIONS

Urushihara, T. et al., "Expansion of HCCI Operating Region by the Combination of Direct Fuel Injection, Negative Valve Overlap and Internal Fuel Reformation", SAE Technical Paper Series No. 2003-01-0749, 2003 SAE World Congress, Detroit, MI., Mar. 3-6, 2003.

*Primary Examiner* — Thomas Denion
*Assistant Examiner* — Jonathan Matthias
(74) *Attorney, Agent, or Firm* — Julia Voutyras; Alleman Hall McCoy Russell & Tuttle LLP (57) ABSTRACT

Method and systems are provided for operating an engine having a hydrocarbon retaining system coupled to an engine exhaust and an engine intake. During an engine cold start, routing exhaust gas to the hydrocarbon retaining system to store hydrocarbons in the hydrocarbon retaining system. Then, depending on temperature, the hydrocarbons are purged with varying amounts of exhaust gas and fresh air in order to maintain proper temperature control.

16 Claims, 5 Drawing Sheets

U.S. PATENT DOCUMENTS

| | | | |
|---|---|---|---|
| 2007/0199302 A1 | 8/2007 | Yavuz et al. | |
| 2009/0013973 A1* | 1/2009 | Yamasaki | 123/519 |
| 2009/0120067 A1* | 5/2009 | Elwart et al. | 60/285 |

FOREIGN PATENT DOCUMENTS

| | | |
|---|---|---|
| EP | 0311450 | 2/1993 |
| EP | 0311452 | 3/1993 |
| EP | 0552283 | 9/1994 |
| EP | 0431648 | 3/1995 |
| EP | 0592437 | 12/1995 |
| EP | 0586830 | 3/1996 |
| EP | 0458882 | 1/1997 |
| EP | 0584737 | 12/1998 |
| EP | 0677142 | 3/2000 |
| EP | 0767182 | 11/2000 |
| EP | 0758713 | 5/2001 |
| EP | 0715657 | 4/2002 |
| EP | 0719937 | 4/2002 |
| EP | 1132589 | 12/2002 |
| EP | 0691883 | 2/2003 |
| EP | 0950800 | 4/2003 |
| EP | 0973611 | 6/2003 |
| EP | 1029170 | 8/2004 |
| EP | 1113869 | 1/2005 |
| EP | 1015384 | 7/2005 |
| EP | 1194215 | 11/2005 |
| EP | 1220715 | 2/2006 |
| EP | 1192119 | 3/2006 |
| EP | 1129153 | 4/2006 |
| EP | 1317317 | 5/2007 |
| EP | 1317666 | 8/2007 |
| JP | 06101451 | 4/1994 |
| JP | 06101461 | 4/1994 |
| JP | 06200744 | 7/1994 |
| JP | 2002-295247 | 10/2002 |
| JP | 2004-132193 | 4/2004 |
| JP | 2004-148190 | 5/2004 |
| JP | 2004225550 A * | 8/2004 |
| WO | 96/17157 | 6/1996 |

* cited by examiner

HYDROCARBON RETAINING AND PURGING SYSTEM

FIELD

The present description relates generally to an exhaust treatment system for a combustion engine.

BACKGROUND/SUMMARY

Engine out cold-start hydrocarbon emissions generated before light-off of an exhaust system catalytic converter may contribute a large percentage of the total exhaust hydrocarbon (HC) emissions. Accordingly, engine exhaust systems may utilize hydrocarbon retaining devices, such as hydrocarbon traps, to retain cold start emissions for later reaction (HC storing), or for recirculation into the engine intake system (HC purging).

However, the inventors herein have recognized several issues with such systems. In one example, hydrocarbon traps may degrade when aged, for example beyond 150,000 miles. This is in part due to continuous exposure to hot vehicle exhaust which removes acidic adsorption sites on the HC trap. Further, due to the lack of suitable diagnostic routines in the exhaust systems, degradation of various components in an HC retaining system may not be detected in a timely manner, leading to increased HC emissions and accelerated degradation of an exhaust system.

In one example, the above issues may be addressed by a method of operating an engine having a hydrocarbon retaining system coupled to an engine exhaust and an engine intake, the method comprising, during an engine cold start, routing exhaust gas to the hydrocarbon retaining system to store hydrocarbons in the hydrocarbon retaining system. The method may further comprise, during a first purging condition where the exhaust gas is at a first temperature, purging the hydrocarbon retaining system with at least exhaust gas, while during a second purging condition where the exhaust gas is at a second temperature, said second temperature being higher than said first temperature, mixing the exhaust gas with an adjustable amount of fresh air to form a purging gas mixture, and purging the hydrocarbon retaining system with said purging gas mixture.

In this way, by adjusting the composition of a purging gas mixture to provide a temperature controlled gas for purging hydrocarbons (HCs) from a HC retaining system, it may be possible to improve the desorption of HCs from the HC retaining system while reducing the rate of degradation of various components in the HC retaining system. In one example, the amount of fresh air mixed with exhaust gas may be adjusted such that the temperature of the purging gas mixture may be raised high enough to allow improved desorption of stored HCs, in particular long HCs, without raising the temperature to levels that may cause aging of the HC retaining system. In another example, the composition and/or temperature of the purging gas mixture may be adjusted in consideration of the adsorbent and housing material used in the HC retaining system such that component degradation due to continuous exposure to hot vehicle exhaust may be reduced and replacement of components may be deferred to a later age. As such, the amount of fresh air mixed with the exhaust gas to form the purging mixture may be adjusted based on the temperature of the exhaust gas. In another example, the temperature of the purging gas mixture may be adjusted based on an estimated HC load of the HC retaining device such the purging gas mixture may enable appropriate heating of the HC retaining system and an increased desorption of HCs may ensue. By further including a diagnostics routine during HC storing and/or purging, the routine responsive to a temperature of exhaust gas estimated downstream of the HC retaining system, ineffective HC retention and/or release due to aging of HC traps and/or improper valve operations may be diagnosed and addressed in a timely manner, thereby averting degraded emissions quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
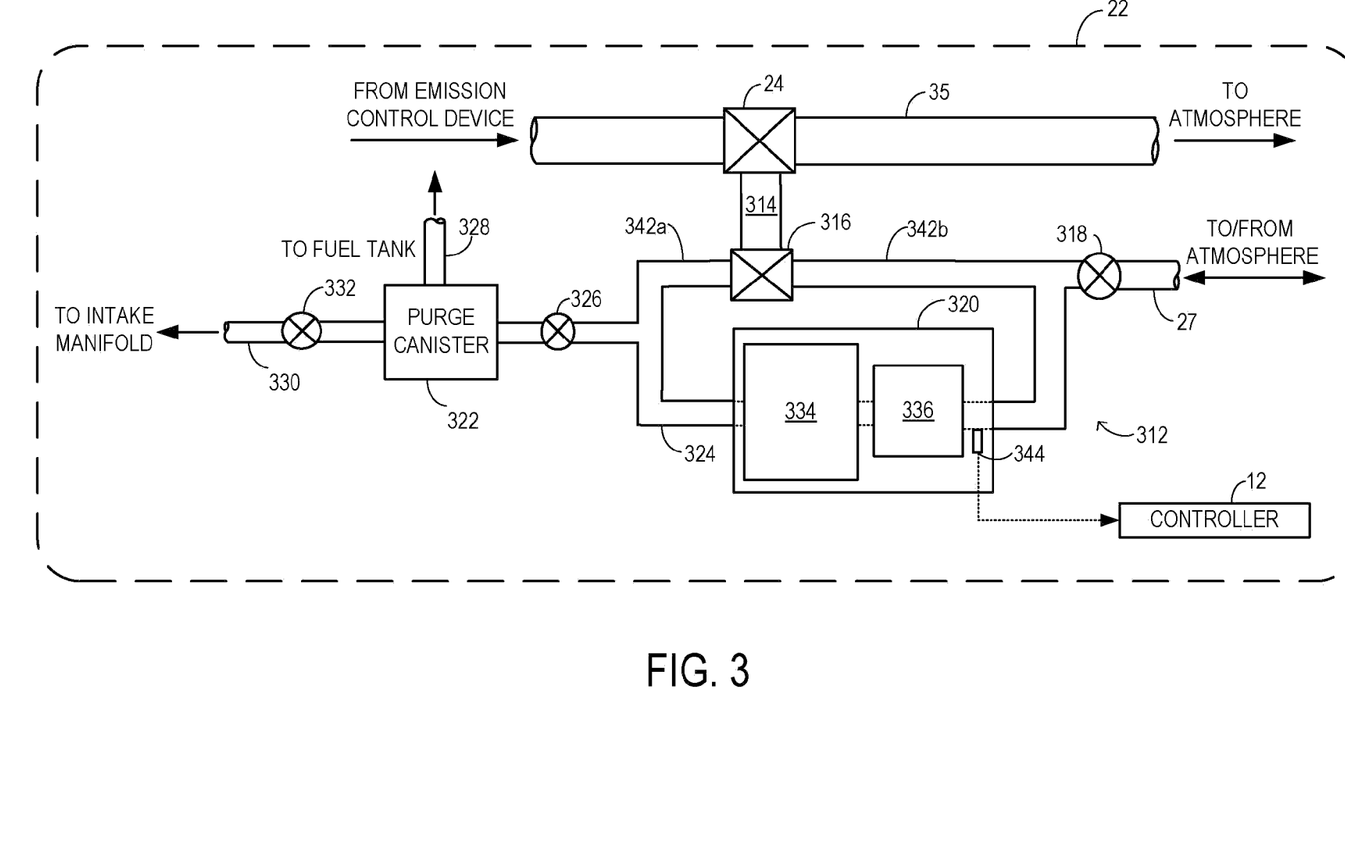
FIG. 3 shows an embodiment of the hydrocarbon retaining system of FIG. 1
Figure 4:
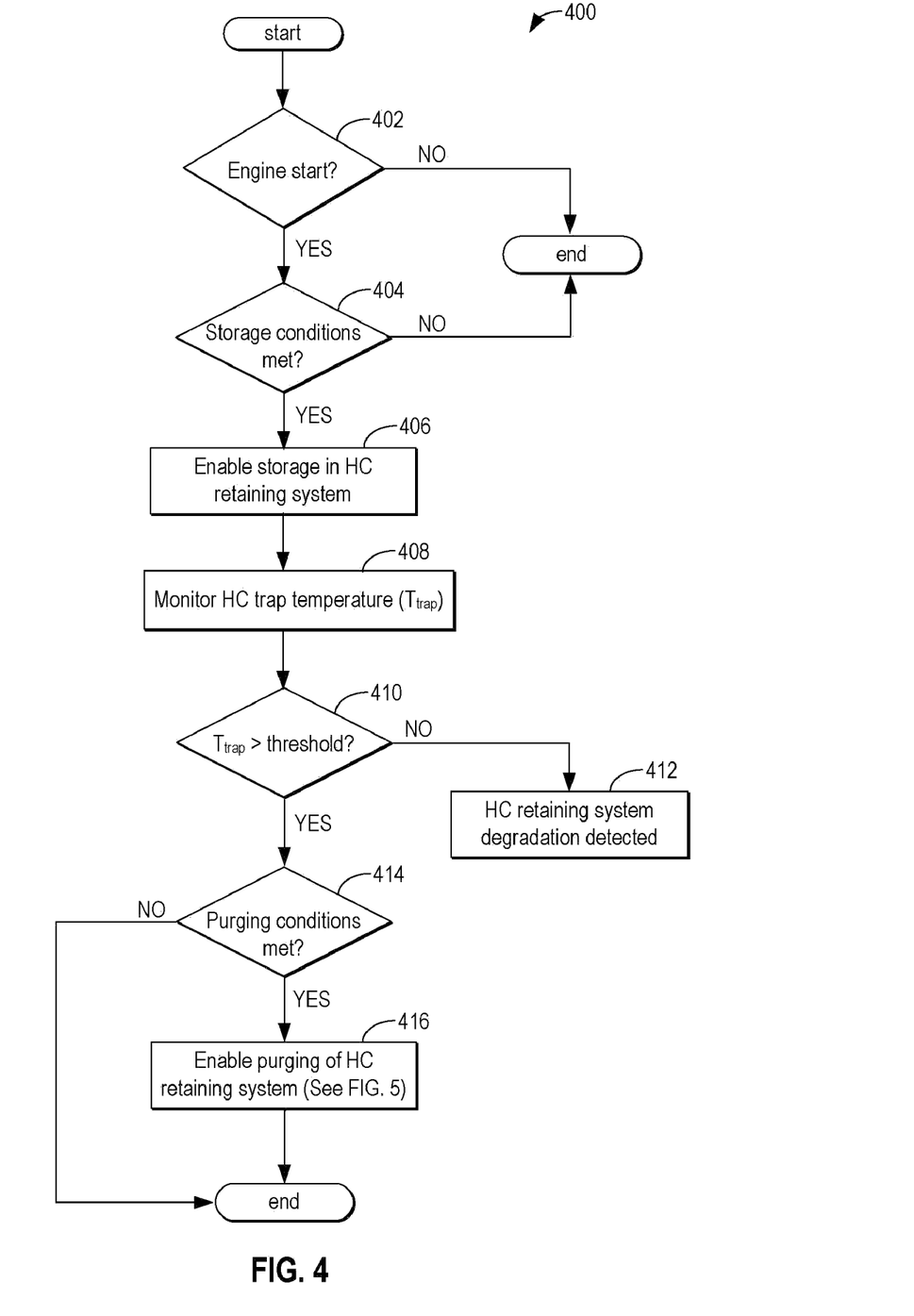
FIGS. 4-5 show high level flow charts illustrating routines that may be implemented for storing and purging hydrocarbons and for identifying component degradation in the HC retaining system according to the present disclosure.
Figure 5:
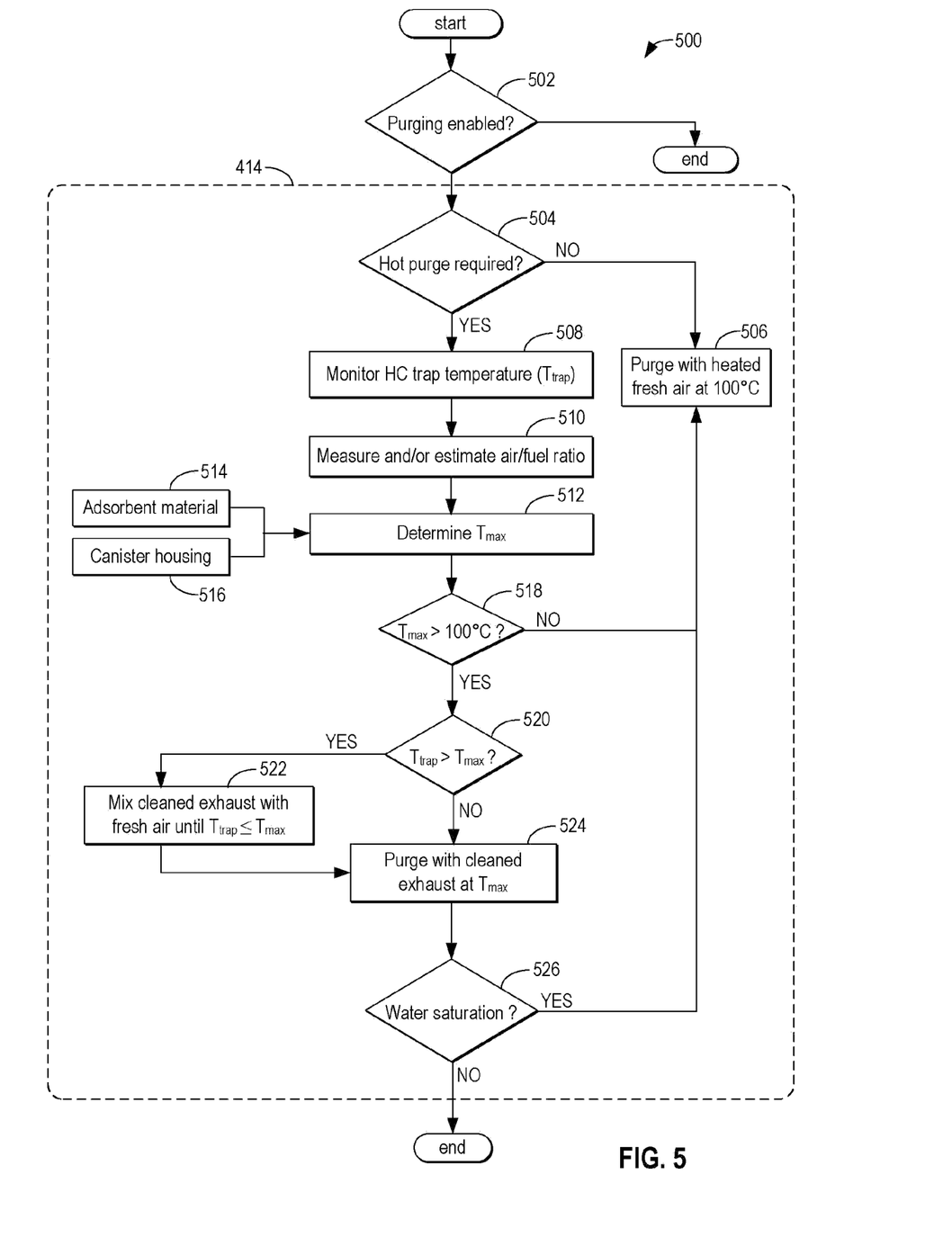

The following description relates to systems and methods for operating and monitoring a HC retaining system and identifying degradation therein. As shown in FIG. 3, a temperature sensor coupled to a HC retaining device (herein a HC trap assembly) in a HC retaining system communicates temperature variations to a control system. Valve degradation and/or HC trap assembly degradation may be inferred from aberrant temperature variations downstream of the HC retaining system during HC storing and purging operations, as shown in FIG. 4. Further, the composition of a purging gas mixture may be adjusted to provide a temperature-controlled mixture to be used for purging operations. The composition, and hence temperature, of the mixture may be adjusted responsive to the characteristics of the HC adsorbent and/or the housing material used in the HC retaining device, as shown in FIG. 5. As the susceptibility of the adsorbent and/or housing material to thermal damage increases, a purging gas mixture with a higher percentage of fresh air relative to hot exhaust gas may be used. In this way, by using temperature controlled air, improved hot air stripping of hydrocarbons (HCs) may be achieved without damaging the HC retaining device. By using temperature based diagnostics to identify malfunction of the HC retaining device, degradation related issues may be identified and addressed in a timely manner. In this way, the quality of exhaust emissions may be improved.

Figure 1:
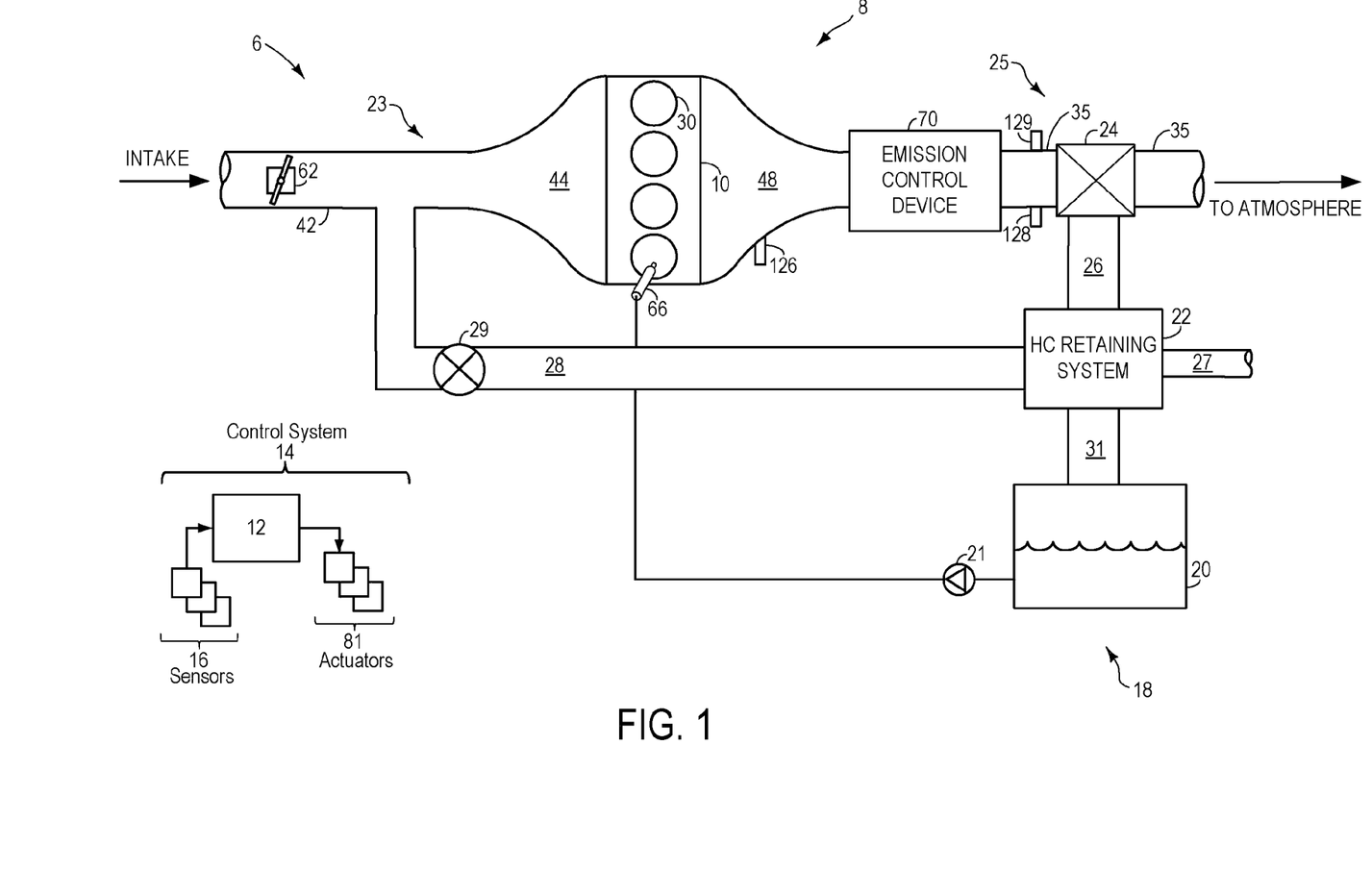
FIG. 1 shows a schematic depiction of an engine and an associated hydrocarbon retaining system.

FIG. 1 shows a schematic depiction of a vehicle system 6. The vehicle system 6 includes an engine system 8 coupled to a hydrocarbon (HC) retaining system 22 and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors, as further elaborated in the example engine of FIG. 2.

The engine exhaust 25 may also be operatively coupled to HC retaining system 22 via conduit 26 and valve 24. In one example, exhaust gases may be routed to the hydrocarbon retaining system 22 during engine cold start operation. Then, once the emission control device 70 has reached its operating temperature, the HCs retained in system 22 may be purged to the engine via engine intake 23, as described below herein.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel system. Vapors generated in the fuel system 18 may be routed to HC retaining system 22, described further below, via conduit 31, before being purged to the engine intake 23.

The fuel tank 20 may hold a plurality of fuel blends, including fuel with a range of alcohol concentrations, such as various gasoline-ethanol blends, including E10, E85, gasoline, etc., and combinations thereof.

HC retaining system 22 may include one or more HC retaining devices, such as a HC trap or a HC trap assembly configured to temporarily trap HCs from entering gases. HC retaining system 22 may further include a vent 27 which may route gases out of the retaining system 22 to atmosphere when storing, or trapping, HCs from the engine exhaust 25 and/or fuel system 18. Vent 27 may also allow fresh air to be drawn into HC retaining system 22 when purging stored HCs from the engine exhaust 25 and/or fuel system 18 to the engine intake 23 via purge conduit 28 and purge valve 29. While this example shows vent 27 communicated with fresh, unheated air, various modifications may also be used. For example, heated intake air from an air cleaner box may be used. Further, heated exhaust gas may be used under selected conditions. A detailed system configuration of HC retaining system 22 is described herein below with regard to FIG. 3. Further various additional components may be included in the intake, exhaust, and fuel system, such as a muffler downstream of valve 24.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, air/fuel ratio, and composition sensors may be coupled to various locations in the vehicle system 6, as discussed in more detail herein. As another example, the actuators may include fuel injector 66, valve 29, valve 24, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 4-5.

HC retaining system 22 can operate to store HCs from a plurality of sources, including the engine exhaust 25 and the fuel system 18, concurrently or during different operating conditions. Under some operating conditions, such as during engine starts when the emission control device is not yet to its light-off temperature (e.g., a temperature at which the device reaches a selected, sufficiently high, conversion efficiency for a particular exhaust constituent), exhaust gas may be routed from the engine exhaust 25 to the HC retaining system 22, and then to the atmosphere through vent 27. In this way, an increased amount of cold start HC emissions may be stored in HC retaining system 22 while the exhaust gases heat emission control device 70. Then, once device 70 reaches sufficient operating temperature, exhaust gases may be routed to the atmosphere through conduit 35 and the HC retaining system 22 may be substantially isolated from the engine exhaust gas. Additionally, fuel vapors generated in the fuel tank 20 may be routed to HC retaining system 22 for storage before being delivered to the engine intake 23 and combusted in the engine 10. These different storing modes (from engine exhaust 25, and from fuel system 18) may be carried out concurrently, separately, or in combinations thereof.

After being isolated from the exhaust gas, the HC retaining system 22 may be coupled to the engine intake to draw fresh air through vent 27 and purge stored HCs into the engine intake to be combusted in the engine. Such purging operation may occur during selected engine operating conditions as described herein. Alternatively, the stored hydrocarbons may be purged using cleaned exhaust gas. In still other examples, the stored hydrocarbons may be purged using a temperature controlled combination of cleaned exhaust gas and fresh air, as further elaborated in FIG. 5.

Figure 2:
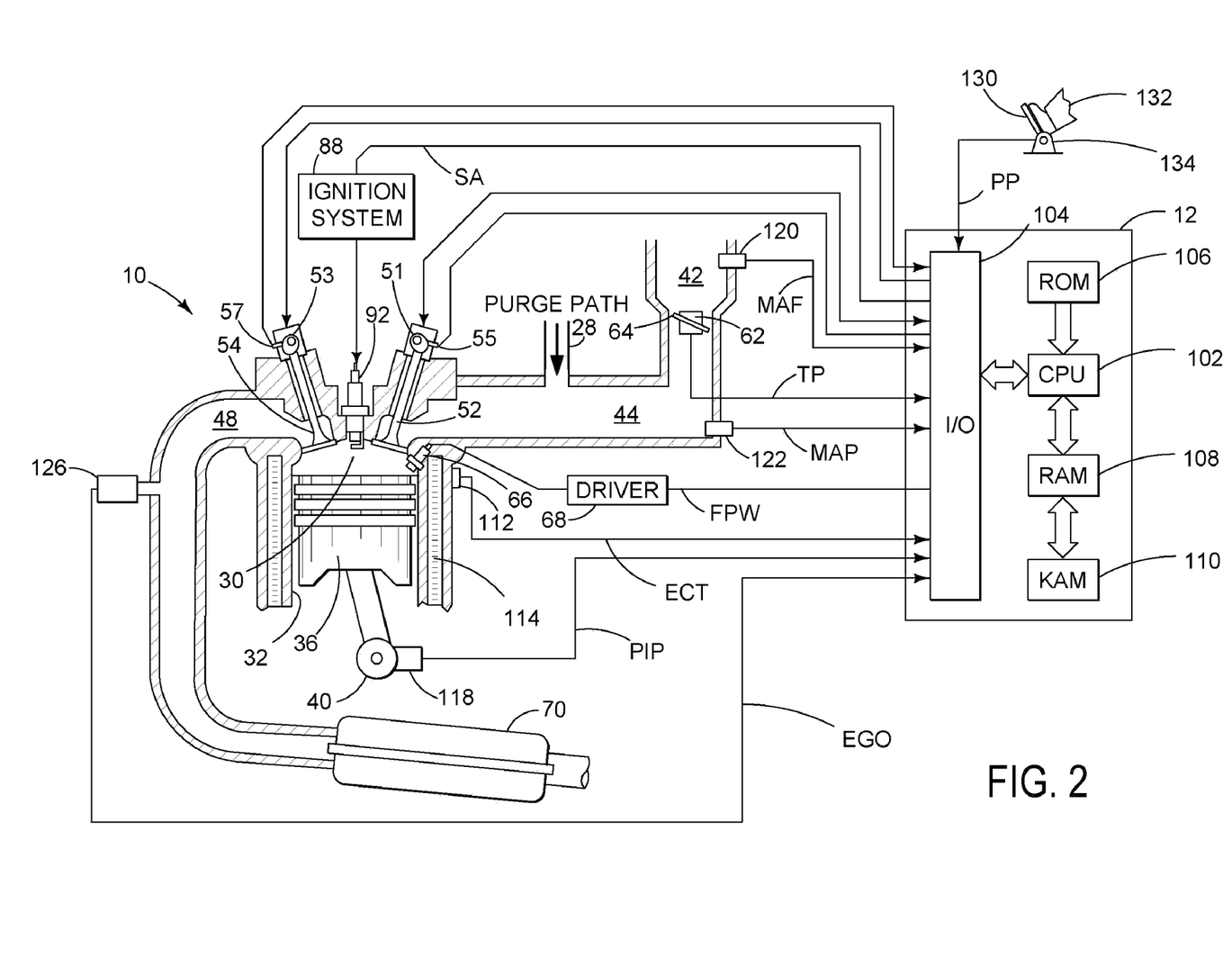
FIG. 2 shows a schematic depiction of an internal combustion engine.

FIG. 2 is a schematic diagram showing one cylinder of multi-cylinder engine 10. As described with regard to FIG. 1, engine 10 may be controlled at least partially by a control system including controller 12, as well as by input from a vehicle operator 132 via an input device 130. In this example, input device 130 includes an accelerator pedal and a pedal position sensor 134 for generating a proportional pedal position signal PP. Combustion chamber or cylinder 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves. The intake manifold may include a purge path 28 fluidly coupled to the exhaust stream allowing purge vapors to be delivered to the engine intake manifold 44. While this example shows the purge path downstream of the throttle to enable manifold vacuum to draw in the gases, various other configurations may also be used. For example, in the case of a turbocharged engine, the purge line(s) may lead to upstream of the turbocharger compressor inlet.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include throttle 62 having a throttle plate 64. In this particular example, the position of throttle plate 64 may be varied by controller 12 via a throttle position signal TP provided to an electric motor or actuator included with throttle 62, a configuration that is commonly referred to as electronic throttle control (ETC). In this manner, throttle 62 may be operated to vary the intake air provided to combustion chamber 30 among other engine cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three-way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF); engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal (MAP) from sensor 122. Engine speed signal, RPM, may be generated by controller 12 from signal PIP. Manifold pressure signal MAP from a manifold pressure sensor may be used to provide an indication of vacuum, or pressure, in the intake manifold.

As described above, FIG. 2 shows only one cylinder of a multi-cylinder engine 10, however each cylinder may similarly include its own set of intake/exhaust valves, fuel injector, spark plug, etc.

FIG. 3 shows an embodiment of hydrocarbon retaining system 22 including hydrocarbon retaining devices, such as HC traps and HC trap assemblies, arranged in parallel with exhaust conduit 35, downstream of the emission control device. Herein, the HC retaining system includes a HC trap assembly 320. An exhaust conduit valve 24 is located in the exhaust conduit for blocking exhaust flow during a first mode, and allowing exhaust flow to pass during a second mode. A branched bypass conduit 312 is coupled to the exhaust conduit valve 24 via connecting conduit 314. Bypass conduit 312 includes two branches namely upper passage 342 and lower passage 324. Upper passage 342 may be further divided into passage 342a (allowing communication of gases from conduit 314 with passage 324), and passage 342b (allowing communication of gases from conduit 314 with vent 27). Bypass conduit 312 is fluidly coupled to connecting conduit 314 through bypass valve 316. Both branches of conduit 312 may communicate with the atmosphere via bypass valve 318. Bypass 312 further includes HC trap assembly 320 comprising a first and second HC trap, 334 and 336, respectively, in the lower branch passage 324. The bypass conduit 312 leads to the atmosphere through vent 27, and optionally through valves 316 and 24, and conduit 35.

HC trap assembly 320 may be fluidly coupled to a purge canister 322 via passage 324. The purge canister 322 may be configured to collect vapor from the fuel system, such as via a conduit 328 leading to the fuel tank. The passage 324 may include a valve 326. The purge canister 322 may also be fluidly coupled to the engine intake via a conduit 330 and valve 332.

Specifically, in this example, valve 24 operates as a diverter valve to either allow exhaust gas flow through conduit 35 to atmosphere, or to direct the exhaust gas flow to conduit 314 and valve 316. Herein, valve 316 is another diverter valve which either allows communication between conduit 314 and passage 324 via passage 342a, or conduit 314 and vent 27 via passage 342b and valve 318. A valve 326 is shown for controlling flow leading to, or coming from, the purge canister 322, which then leads to the fuel tank via conduit 328. The purge canister 322 may also be fluidly coupled to the engine intake via a conduit 330 and valve 332. As such, fuel vapors from the fuel tank may traverse HC trap assembly 320 routed through the first and second traps, 334 and 336, in that order, and purged in the opposite order.

While this example shows two hydrocarbon retaining devices (e.g., HC trap assembly 320 and purge canister 322), various alternatives may be provided. For example, a single hydrocarbon retaining device, such as a canister, may be used, where the canister operates to store both exhaust hydrocarbons as well as fuel tank vapors. Further, the hydrocarbon retaining devices may each be canisters, or may each be HC traps. Irrespective of the particular configuration of the HC retaining system, the hydrocarbon retaining devices can receive routed cold start hydrocarbons and retain the hydrocarbons.

The HC trap assembly may include a brick, or a plurality of bricks or other structures, such as activated charcoal. Alternatively, as depicted, HC trap assembly includes a plurality of HC traps (two depicted herein). HC traps 334 and 336 may also be canisters using micropore (0-2 nm pore size range) or mesopore (2-50 nm pore size range) activated carbon or zeolites. In one example, the traps may comprise granular activated carbon and the HC trap has a plastic housing. As such, plastic housing may be used since the exhaust gas temperatures encountered in the trap may be substantially lower than the full range of exhaust temperatures experienced in the exhaust system. Herein, the plastic housing provides the advantage of reduced costs and improved reliability. However, at higher temperatures (for example above 100° C.), the plastic housing is prone to deformation. In another example, the traps may comprise metal housing, such as steel housing. Similar to the HC traps, purge canister 322 may also include activated charcoal, although it may have a different porosity.

The two HC traps 334 and 336 may be configured with different HC trapping characteristics. In one example, the plurality of HC traps includes HC traps of differing porosity. For example, trap 334 may be of a larger porosity activated carbon, such as a mesopore activated carbon to capture larger HC molecules while trap 336 may be of a smaller porosity activated carbon, such as a micropore activated carbon to capture smaller HC molecules. In another example, trap 334 may include mesopore activated carbon while trap 336 may include micropore zeolites (e.g. 5 angstrom porosity). Alternatively, the HC traps of differing porosity may include zeolite of differing porosity. It will be appreciated that while the depicted example shows two traps in the configuration, more or less traps may be used, each of differing porosity. During storage, the gases may be routed first through 334 and then through 336, such that HC molecule size in the gas is progressively reduced. Additionally, since stored HC molecules may be difficult to remove from the smaller pore activated carbon, the smaller pore activated carbon may be buffered by the larger pore size activated carbon to inhibit HC molecules from irreversibly absorbing into the smaller pores. Furthermore, the adsorption of smaller HC species into trap 336 may occur at higher pressures. As such, the inlet piping diameter from the diverter valve 316 to the traps may be sized sufficiently to provide a desired pressure during storage and purge operation. Removal is performed in the opposite direction. In this way, the larger pores better protect the smaller pores and reduce irreversible adsorption of larger HC molecules into the smaller pores. The adsorption of small HC species into the small pore medium may better respond to pressure, such as approximately 5 MPa, which can be provided by sizing of the inlet piping diameter from the diverter valve to the canisters. Similarly, removal of the HC species may benefit from increased temperature, such as through heat transfer from exhaust gas, or by using at least some cleaned exhaust gas, such as during idle conditions.

The configuration of FIG. 3 also allows for opposite flow direction during storage and purging operation, for both traps 334 and 336. Specifically, during storage of HC in the exhaust gas, the diverter valves 24 and 316 and bypass valve 318 route the exhaust gas through conduit 314 and passage 342a and 324 on to trap 334, and then 336, before being vented via 27. During purging of the traps, the valves are adjusted to route fresh air through vent 27, trap 336, and then trap 334, before being delivered through passage 324 and valve 326 on to the intake manifold. The fresh air may be received via an air cleaner box. Alternatively, fresh air may be received via a purge canister coupled in the fuel vapor recovery system. Additionally, or optionally, purging of the traps with preheated fresh air (for example after passage through an air cleaner box) or hot vehicle exhaust, or a temperature controlled combination thereof, may be used to provide improved performance. In this way, improved storage and release of HC can be achieved, especially in light of the differential characteristics (e.g., porosity) of the traps.

A temperature sensor 344 may be coupled to HC trap assembly 320, downstream of HC trap 336, in between the HC trap assembly and the engine exhaust, for diagnostic purposes. In one example, during HC storing operations, the temperature of exhaust gas flowing through the HC trap assembly, and subsequently being vented via conduit 312 and valve 318, may be monitored. As further elaborated in FIG. 4, variations in the temperature may be communicated with controller 12 and used to diagnose problems with the HC trap assembly and/or related valves, such as diverter valves 24 and 316. In another example, during HC purging operations, the temperature sensor may be used to estimate the temperature of a cleaned exhaust gas to be used for purging purposes, as may enter the HC trap assembly through a reverse direction to the direction of exhaust flow during HC storing. Herein, based on the type of housing used for the HC traps and/or based on the characteristics of the adsorbent material used in the HC traps, the exhaust gas may need to be mixed with fresh air to lower the temperature of the gas entering the HC trap assembly. In one example, when the HC trap housing is made of plastic, the cleaned exhaust gas to be used for purging operations may not be higher than 100° C. By measuring the temperature of the exhaust gas and appropriately mixing it with fresh air, the temperature may be reduced and damage to the HC trap assembly may be averted. It will be appreciated that in some examples, an exhaust gas air-fuel ratio sensor may be operated as a temperature sensor under select conditions.

A pressure sensor (not shown) may also be included in HC trap assembly 320 to measure a pressure difference across the assembly. Specifically, the pressure sensor may measure a pressure difference across the two HC traps, or each individual HC trap. The pressure difference may be used by the controller to calculate a HC load level and consequently used as an input for determining whether to continue or stop a HC storing operation and/or whether to start or stop a HC purging operation. The pressure differential across the adsorbent bed of the HC trap assembly may be measured during the trapping or purging as an indication of the presence of a flow restriction. As such, a loss of adsorbent would lead to a reduction in the pressure difference, for a given flow rate. It will be appreciated, that additionally or optionally, a fuel vapor/hydrocarbon sensor coupled to the trap assembly may be used to directly measure the effectiveness of the trap during trapping since any degradation in the trap would result in an increase in the HC breakthrough at vent 27. The same may also be used to identify aging on the adsorbent in use in the HC trap given that desorption of the HC reduces significantly with aging of the HC trap. The hydrocarbon retaining system 22 may be operated by a controller in a plurality of modes by selective adjustment of the various valves. For example, the following operating modes may be performed:

Mode A: Exhaust Hydrocarbon Storage

During select engine and/or vehicle operating conditions, the controller 12 may adjust valve 24 to divert exhaust gas to conduit 314, and adjust valve 316 to divert exhaust gas to conduit 312 (specifically to passage 324). Additionally, the controller may close valves 332 and 326 but leave valve 318 open. Example operating conditions include cold engine starting operation before the emission control device has reached a light-off temperature. In this mode, exhaust from engine 10 is routed via HC trap assembly 320, specifically through HC traps 334 and 336, in that order, before exiting to the atmosphere via valve 318 and vent 27. During this operation, the purge canister 322 is isolated from the exhaust gas and hydrocarbon trap assembly. Additionally, during the HC storing condition, temperature sensor 344 may be used for detecting degradation of the HC retaining system in response to a temperature of the exhaust being below a predetermined threshold. The temperature estimated may alternatively be a temperature gradient of the exhaust gas. In this way, Mode A enables storing of hydrocarbons from the engine exhaust in the HC retaining device.

Mode B: Fuel Vapor Storage

During select engine and/or vehicle operating conditions, the controller 12 may adjust valve 24 to direct exhaust gas through conduit 35, and isolate the hydrocarbon trap assembly 320 from exhaust gas. Additionally, the control may open valve 326 and valve 318, and close valve 332. In this mode, at least some fuel tank vapors are routed through and retained in both purge canister 322 and HC trap assembly 320 before being vented through vent 27.

Mode C: HC Trap and/or Canister Purging

During select engine and/or vehicle operating conditions, the controller 12 may adjust valve 24 to divert exhaust gas through conduit 35, and adjust valve 316 to prevent fresh air from entering conduit 314. In doing so, the hydrocarbon trap assembly 320 may be isolated from the exhaust gas. Additionally, the control may open valve 326, and controllably open valve 332 and valve 318 such that fresh air is drawn through vent 27 to purge HC trap assembly 320, specifically through HC traps 336 and 334, in that order, and purge canister 322 through conduit 330 and valve 332 to the engine intake. In this mode, the purged fuel vapors from the canister and/or HC trap are combusted in the engine, while exhaust gas is routed through conduit 35 to the atmosphere after treatment by the emission control device.

In an alternative embodiment, rather than drawing in fresh air via vent 27 for purging stored hydrocarbons, the system may additionally or alternatively route exhaust gases to the vent to enable heated exhaust to heat the hydrocarbon retaining system and better purge stored hydrocarbons. Such operation may be used during specific conditions, such as cold ambient temperatures. Further, under some conditions, the system may intentionally route cleaned exhaust gases during the storing mode for a longer duration to heat the hydrocarbon retaining system to a higher temperature, thereby improving the subsequent purging operation. In one example, before a purging operation, exhaust gases may be routed to the hydrocarbon retaining system (even during non-starting conditions) to increase temperature and improve the subsequent purging efficiency. This operation may be used when temperature of the hydrocarbon retaining system falls below a threshold value, or when reduced purging opportunities are present.

Similarly, during a purging operation, cleaned exhaust gases may be routed through the hydrocarbon retaining system to allow for improved purging. Alternatively, fresh air heated by passage through the cleaner box, or the purge canister, may be used for purging operations. In another example, purging of the hydrocarbon retaining device may be performed with a purging gas mixture having an adjustable composition of exhaust gas and fresh air, the composition of the purging gas mixture adjusted responsive to temperature. Herein, the cleaned exhaust gases may be combined with fresh air to form a purging gas mixture that is at a lower temperature. For example, controlled amounts of exhaust gas and/or fresh air may be provided and adjusted to better perform purging operations. The amount of fresh air mixed with exhaust gas may be adjusted within a range from no fresh air to all fresh air. As such, temperature sensor 344 coupled to the HC trap assembly 320 may monitor the temperature of the purging gas mix entering the HC trap assembly during a purging operation. Accordingly, controller 12, in communication with the temperature sensor, may control the ratio of cleaned exhaust gas to fresh air that is being mixed, for example by performing routine 500 elaborated herein below in FIG. 5. As the temperature of the exhaust gas increases beyond a threshold, by increasing the amount of fresh air in the purging gas mixture, the net temperature of the purging mixture may be brought within a desired operating range. For example, the relative amount of fresh air to exhaust gas may be increased. As another example, both the total amount of purge gas as well as the relative amount of fresh air to exhaust gas may be increased. This operation may be particularly advantageous when used with a housing of the HC trap assembly made of plastic (in contrast to metal, for example) that may be subject to thermal damage (for example deformation) at a lower temperature threshold. Alternatively, or additionally, this operation may be used when the adsorbent used in the HC traps includes activated carbon (in contrast to zeolites, for example) that may be subject to oxidative deterioration at a lower temperature threshold. However, it may further be used with metal housings and with zeolite-based HC retaining devices. The threshold temperature may be further adjusted responsive to a HC load of the HC retaining system. In this way, purging may be controlled and the composition of a purging gas mixture may be adjusted responsive to a temperature of the exhaust gas. For example, the purge gas temperature may be decreased by decreasing heated gas and/or increasing fresh air, and vice versa. While the depicted example shows combined purging of the fuel tank vapors and stored exhaust hydrocarbons, in alternative configurations these may be purged independently. For example, the example HC traps may be purged via a purge line in parallel with a purge line of the example canisters, to thereby enable separate and/or independent purging of the different hydrocarbon storage systems. For example, one hydrocarbon retaining device may be purged without purging a second hydrocarbon retaining device. Further still, the fuel tank vapors in the purge canisters may be purged sufficiently faster than the hydrocarbons in the HC traps. As such, during initial purging, the learned vapor amount/concentration can be used to determine the amount of fuel vapors stored in the canister, and then, during a later portion of the purging operation (when the canister is sufficiently purged or empty), the learned vapor amount/concentration can be used to estimate a loading state of the HC traps (that was generated during the most recent storing operation, such as the most recent cold start event).

Further still, while the depicted example shows non-concurrent storing of exhaust gas hydrocarbons and purging of the retaining system 22, in alternative embodiments, some stored hydrocarbons may be purged during storage of other hydrocarbons.

Referring now to FIG. 4, an example routine 400 is shown for exhaust emission management, specifically for a HC storing operation preceding, and possibly immediately preceding, a HC purging operation. Routine 400 may operate during a cold-start condition or a warm-up condition, such as while the engine or exhaust warms from ambient temperatures to it normal operating temperature range. A subsequent example HC purging routine 500, as further elaborated in FIG. 5, using temperature controlled air may follow routine 400. Routines 400 and 500 may be implemented using systems, components, and devices described herein, but alternatively may be implemented using other suitable systems, components, and devices.

First, at 402, the routine determines whether an engine start is present. For example, the routine may determine whether the engine is being started from rest. Additionally, or optionally, the routine may determine whether the engine has been started via engine cranking operation. If the engine has not been started, the routine may end. When an engine start is present, the routine continues to 404, where the routine determines if HC storage conditions have been met. In one example, storage may be enabled when the capacity of hydrocarbon storage of the retaining system 22 is greater than a threshold value. In another example, storage may be enabled when the HC retaining system 22 has been purged during a previous engine operation. Additionally, the routine may enable storage of hydrocarbons in retaining system 22 when the temperature of retaining system 22 is less than a maximum storage temperature and/or when the temperature of the emission control device 70 is below a threshold temperature. Further still, the routine may enable storage of exhaust hydrocarbons in retaining system 22 based on a fuel property of the fuel combusted in the engine, such as an alcohol amount in the fuel.

If at 404, storage conditions are met, then at 406, HC storage may be enabled in the HC retaining system 22. Herein, the routine adjusts the diverter valves 24 and 316 and further regulates flow through one or more of valves 318, 326 and 332, to direct exhaust gas from downstream of emission control device 70 through the hydrocarbon retaining system 22. Specifically, the exhaust gases are diverted through the HC trap assembly 320 before being vented or routed to the atmosphere. In one example, the routine operates the system in MODE A, as described above herein. It will be appreciated that the exhaust gas may be routed through various additional emission control devices and/or mufflers before being delivered to the atmosphere. The routine may optionally also estimate the amount of stored hydrocarbons based on an exhaust gas flow rate, exhaust temperature, temperature of hydrocarbon retaining system 22, pressure across the hydrocarbon retaining system 22, engine speed, and various other parameters. In this way, under selected storage conditions, such as during an engine cold start, by routing exhaust gas to the hydrocarbon retaining system, hydrocarbons may be stored therein. If the storage conditions are not met at 404, then the routine may end.

At 408, during the HC storing condition, the routine proceeds to estimate and/or monitor a temperature of exhaust gas downstream of the HC retaining system, herein the HC trap assembly, for diagnostic purposes. The temperature-based diagnostic may be applied as either or both of a functional or threshold monitor. As a functional monitor, the temperature sensor may determine if the HC trap assembly is connected and functioning as expected while as a threshold monitor, the sensor may determine the effectiveness of the hydrocarbon retaining system.

Controller 12 may receive temperature readings from temperature sensor 344 coupled to the HC trap assembly 320, downstream of HC trap 336. Specifically, during a HC storage operation, the temperature sensor 344 estimates the temperature of exhaust gas that has traversed the HC trap assembly ($T_{trap}$), before it is vented to the atmosphere though vent 27.

At 410, the routine determines whether the temperature of exhaust gases measured at the outlet of the HC trap assembly ($T_{trap}$) is greater than a predetermined threshold. Following a cold start, the temperature at the outlet of the trap assembly is expected to increase as the exhaust system warms up. An increase in temperature beyond a predetermined threshold indicates that the HC trap assembly is connected to the exhaust system and the valves used to divert the flow to the trap assembly are functioning. Thus, at 410, if the estimated temperature is below the predetermined threshold, then at 412, a degradation of the HC retaining system may be concluded, and identified via setting a diagnostic code (readable by a universal vehicle code reader), for example. As such, the estimated temperature of the exhaust gas may include a temperature gradient of the exhaust gas. Further analysis may follow to determine whether the HC retaining system degradation is due to diverter valve degradation or due to HC trap assembly degradation. Based on the identified cause of degradation, the controller may proceed to take mitigating actions to prevent further degradation to the HC trap assembly and hence emissions quality. Example mitigating actions include, but are not limited to, inhibiting actuation of diverter valve 24, actuating one or more alternate bypass valves, directing exhaust gas to the intake, directing exhaust gas to purge canister and/or fuel tank, and combinations thereof.

It will be appreciated that after the flow is allowed to bypass the traps, the temperature should stabilize, indicating that the valves have cycled properly. A continued increase in the temperature would indicate that the traps are still being exposed to exhaust gas. During the purge cycle, the temperature should drop as fresh air is inducted into the trap. In this way, by monitoring a temperature of exhaust gases downstream of a HC trap assembly, during a HC storage operation, a proper functioning of a HC retaining system may be provided. By detecting degradations in a HC retaining system at the earliest opportunity, the quality of exhaust emissions may be improved.

If the temperature at the outlet of the trap assembly increases as expected, then at 414, the routine may continue to determine whether HC purging conditions have been met. Initiating the purging of the hydrocarbon retaining system 22 may be based on various engine and vehicle operating parameters, including the amount of hydrocarbon stored in the retaining system 22 (such as the amount of hydrocarbons stored in HC trap assembly 320), the temperature of the emission control device 70, temperature of the hydrocarbon retaining system, fuel temperature, the number of starts since the last purge, fuel properties (such as the alcohol amount in the combusted fuel), and various others. In one example, purging conditions may be considered met if the routine determines that exhaust gases were previously routed to the hydrocarbon retaining system 22 during the current engine start. If purging conditions are not met at 414, then the routine may end.

If the purging conditions are met at 414, the routine continues to 416 to enable purging of the HC retaining system by performing routine 500 as further elaborated now in FIG. 5. In one example, routine 500 may operate following a prior HC storing operation once the emission control device has warmed up to a light-off temperature. As such, routine 500 encompasses a method of controlling HC purging by operating the valves to allow fresh air, cleaned exhaust, or a combination thereof to be drawn through the hydrocarbon retaining system 22 and subsequently into intake passage 42 of engine 10. Specifically, the routine allows the composition of a purging gas mixture to be adjusted responsive to an exhaust gas temperature. This may include operating the system in MODE C. Routine 500 also encompasses a method for monitoring the temperature of a purging gas mix used for purging of stored HCs responsive to the housing characteristics of the HC traps as well as the adsorbent material used therein.

At 502, routine 500 determines if HC purging has been enabled. As such, purging may be enabled when the purging conditions have been met, as previously elaborated in routine 400 (FIG. 4, at 414). If purging has not been enabled, for example due to the purging conditions not being met, then the routine may end. If purging is enabled, then at 504 the routine determines whether a hot purge is required. In one example, a hot purge may be desirable when the HC trap load, for example as determined by a pressure sensor measuring a pressure across the HC trap assembly, is greater than a predetermined threshold. In another example, a hot purge may be required to compensate for an incomplete or an inefficient purging operation (for example a hot purge or a cold purge) during a previous cycle. In still another example, a prior knowledge of the fuel composition may indicate the presence of a large fraction of long chain HCs which may be desorbed from the HC trap only via a hot purge. It will be appreciated that in an alternate embodiment, the hot purge selected at 504 may be a periodic hot purge of a short duration. In one example, a periodic hot purge of a short duration may be scheduled for a complete cleaning of the HC trap and to remove any coke or ash that may be clogging the trap. The periodic hot purge may be scheduled after a predetermined number of purging cycles, a predetermined number of hours of engine operation, a predetermined age of the HC trap, or other appropriate operating condition.

If a hot purge is not required, then at 506 the HC retaining system may be purged with heated fresh air, for example air at 100° C. If a hot purge is required, then at 508, the routine proceeds to monitor the temperature of cleaned exhaust gas that may enter the HC trap assembly, in a counter-flow direction from the storing operation, to be used for the purging operation (herein also referred to as a trap temperature $T_{trap}$). The temperature may be estimated by temperature sensor 344 coupled to HC trap assembly 320. As previously elaborated in FIG. 4, the temperature measurement may also be used for a diagnostic purpose. As such, in contrast to the storage cycle, during the purge cycle, the temperature at the outlet of the HC trap assembly is expected to drop as fresh air is inducted into the trap. However, it will be appreciated that during the purge cycle, the temperature may additionally be affected by the percentage of the flow that is adsorbed or desorbed on the carbon bed (primarily water and HC) as well as the flow rate of the purging gas.

At 510, the routine estimates and/or measures an exhaust air/fuel ratio. The estimated air/fuel ratio allows an oxygen level of the exhaust gas to be determined. The air/fuel ratio may be determined by a HEGO sensor incorporated in the HC trap assembly, or a HEGO sensor configured in the emission control device. At 512, the routine may determine an upper temperature threshold for purging ($T_{max}$). The temperature threshold may be assigned at 512 based on the estimated air/fuel ratio and further based on inputs received at 514 and 516. At 514, the adsorbent material is read and accordingly an upper threshold of temperature tolerance is assigned. In one example, this may be a temperature above which the adsorbent material may be irreversibly damaged. For example, if the adsorbent material is microporous zeolite, the maximum temperature that it may withstand before deterioration may be 600° C. In another example, if the adsorbent material is activated carbon, there may be a range of temperatures at which a purging operation may be performed. Herein, the upper threshold of tolerance may vary based on the oxygen content (or air/fuel ratio) of the exhaust gas. The upper threshold may be a maximum temperature that it may withstand before deterioration by oxidation. At 516, the composition of the HC trap(s) or purge canister housing may be considered and accordingly an upper threshold of temperature tolerance assigned. In one example, this may be a temperature above which the housing may undergo thermal damage, such as deformation. For example, if the housing material is plastic, then the maximum temperature that it may withstand may be 100° C. In another example, if the adsorbent material is steel, then the maximum temperature that it may withstand may be 800° C. As such, a plastic housing may be desirable due to high metal costs. Thus, at 512, based on the combination of adsorbent and canister housing used, and based on the estimated air/fuel ratio, a minimum of the upper thresholds may be selected and assigned as the upper temperature threshold for purging ($T_{max}$). In one example, if the adsorbent material is zeolite and the canister housing is made of plastic, then $T_{max}$ may be 100° C. (the lower of 600° C. and 100° C.). It will be appreciated that the exhaust air/fuel ratio may be of greater significance when calculating an upper threshold for an activated carbon adsorbent. For example, when the adsorbent material is activated carbon and the air/fuel ratio sensor indicates that the exhaust gas is without oxygen, a higher upper threshold may be selected. In another example, when the air/fuel ratio indicates the presence of oxygen, a lower upper threshold may be selected to reduce loss of carbon by deterioration into carbon monoxide. In this way, the threshold may be adjusted responsive to the exhaust air-fuel ratio as well as the adsorbent and housing material used in the HC retaining system.

At 518, the routine verifies if the upper temperature threshold for purging ($T_{max}$) is higher than a predetermined threshold, for example 100° C. as depicted in routine 500. If at 518, the estimated $T_{max}$ is determined to not be higher than the predetermined threshold, then the routine may return to 506 to purge the hydrocarbons with heated fresh air at a temperature below the threshold, such as at 100° C., or lower. However, if the estimated $T_{max}$ is higher than the predetermined threshold, then at 520, the routine determines if the temperature of the cleaned exhaust gas ($T_{trap}$) is above the upper temperature threshold for purging ($T_{max}$).

If $T_{trap}$ is not greater than $T_{max}$, then during this first purging condition where the exhaust gas is at a (first) temperature below the threshold, the routine proceeds to 522 to purge the stored hydrocarbons in the HC retaining system with the exhaust gas cleaned by passage through the cleaner box. As such, the temperature of the exhaust gas used herein may not exceed $T_{max}$. However, if $T_{trap}$ is greater than $T_{max}$, then during this second purging condition where the exhaust gas is at a (second) temperature, higher than the threshold temperature to be used for purging ($T_{trap}$), then at 524, the cleaned exhaust gas may be mixed with an amount of fresh air to obtain a purging gas mixture where the temperature is brought to, or below, the threshold temperature. The controller may be configured to adjust the amount of fresh air mixed with the exhaust gas based on the (second) temperature of the exhaust gas. In one example, the amount of fresh air may be adjusted with within a range from no fresh air (0%) to all fresh air (100%). A lookup table may be used from where a given ratio of mixed gases and an expected temperature may be read. Once the temperature of the purging mix is brought within limits, the controller purges the HC retaining system with the purging gas mixture at 524. As such, this may include operating the system in MODE C.

When purging with clean exhaust, the steam content of the exhaust may cause the canister and/or the adsorbent to become saturated with water. Accordingly, at 526, it is determined whether water saturation has occurred. In one example, this may be determined with the help of a humidity sensor. If water saturation has not occurred, the routine may end. Else, if water saturation has occurred, then the routine may return to 506 to purge the HC retaining system with heated fresh air at 100° C. such that the water may be removed by evaporation.

Optionally, the routine may also estimate the amount of purged hydrocarbons from the hydrocarbon retaining system 22 (which may be attributed to the purge canister, the HC trap assembly, or both) based on various parameters including the amount of stored hydrocarbons, as well as feedback information from exhaust air-fuel ratio sensors. In one example, feedback from an exhaust gas oxygen sensor may be used to learn or update the estimated amount of hydrocarbons stored in the HC trap to determine degradation of the HC trap based on such an estimate. Further, the routine may also adjust throttling of the engine to adjust an amount of purge gases drawn through a purge canister, HC trap assembly, or both. Alternatively, the learned hydrocarbon amount during purging may be used to determine the performance of a HC trap assembly that was loaded and then purged during conditions with little to no fuel tank vapor generation, and before which the fuel tank vapors were sufficiently purged. In another particular example, the HC trap assembly performance may be diagnosed based on detecting change in a temperature condition of gas during purging of gases through the trap.

While not illustrated specifically, the control system may also operate the system in MODE B whenever the system is not operating in MODE A or C. Alternatively, MODE B may be selectively enabled based on various operating conditions, including ambient temperature, fuel temperature, and others.

In this way, temperature controlled gasses may be used for providing efficient purging while maintaining the integrity of both the adsorbent and the housing material of a HC retaining system. By mixing cleaned exhaust gas and fresh drawn air in appropriate ratios, a purging gas mix of a desirable temperature may be obtained. The temperature measurement may further be used for diagnostic purposes to detect degradation in the HC retaining system at an earlier time, such as during a HC storing operation. An adsorption function of the HC retaining traps may also be diagnosed based on the estimated or inferred temperature.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. An engine method, comprising:
    storing exhaust hydrocarbons by routing engine exhaust through a hydrocarbon trap assembly in a first direction through a first hydrocarbon trap and then a second hydrocarbon trap;
    storing fuel tank vapors in both a purging canister and the first and second hydrocarbon traps by routing the fuel tank vapors in the first direction; and
    purging both the hydrocarbon traps and the canister to an engine intake with an adjustable mixture of exhaust gas and fresh air routed through the hydrocarbon traps opposite the first direction, wherein the first hydrocarbon trap has a larger porosity than the second hydrocarbon trap, and wherein the adjustable mixture has a composition that brings a temperature of the adjustable purging mixture entering the hydrocarbon traps below a threshold that is based on each of oxygen content of the exhaust gas, adsorbent used in the hydrocarbon traps and canister housing used in the hydrocarbon trap assembly.

2. The method of claim 1 wherein the second hydrocarbon trap is downstream of the first hydrocarbon trap in a direction of exhaust flow during storing operation, and wherein the first hydrocarbon trap is downstream of the second hydrocarbon trap in a direction of exhaust flow during purging operation.

3. A method comprising:
    storing exhaust hydrocarbons by routing engine exhaust through each of a first upstream trap and a second downstream trap of a hydrocarbon trap assembly in a first direction, the first trap having a larger porosity than the second trap;
    retaining fuel tank vapors in both a purging canister and the hydrocarbon trap assembly by routing the fuel tank vapors in the first direction; and
    purging both the hydrocarbon trap assembly and the canister to an engine intake with a purging gas mixture having an adjustable composition of exhaust gas and fresh air adjusted responsive to temperature so as to bring the temperature of the purging gas mixture entering the hydrocarbon trap assembly below a threshold, the threshold based on a combination of adsorbent and canister housing used in the hydrocarbon trap assembly and further based on an oxygen content of the exhaust gas, the exhaust gas and fresh air mixed before entering the hydrocarbon trap assembly, the mixture routed in an opposite direction through the second trap followed by the first trap.

4. The method of claim 3 wherein the temperature is a temperature of exhaust gas downstream of the second trap.

5. The method of claim 4 wherein adjusting the composition of the purging gas mixture responsive to temperature includes, as the temperature increases beyond the threshold, increasing an amount of fresh air in the purging gas mixture.

6. A method for operating an engine having a hydrocarbon trap assembly coupled to an engine exhaust and an engine intake, comprising:
    during an engine cold start, routing exhaust gas and fuel tank vapors in a first direction through a first, upstream trap and then a second, downstream trap of the hydrocarbon trap assembly to store hydrocarbons, the first trap having a larger porosity than the second trap;

during a first purging condition where the exhaust gas is at a first, lower temperature, purging stored hydrocarbons from the hydrocarbon trap assembly to the engine intake with at least exhaust gas routed through the second trap and then the first trap in a second direction opposite to the first direction; and during a second purging condition where the exhaust gas is at a second, higher temperature, mixing the exhaust gas with an amount of fresh air to form a purging gas mixture that enters the hydrocarbon trap assembly, and purging the stored hydrocarbons from the hydrocarbon trap assembly to the engine intake with said purging gas mixture routed in the second direction.

7. The method of claim 6 wherein the amount of fresh air is adjusted based on the second temperature of the exhaust gas to bring a temperature of the purging gas mixture entering the hydrocarbon trap assembly below a threshold, and where an engine intake manifold vacuum draws in the purging gas mixture.

8. The method of claim 7 wherein the amount of fresh air is adjusted within a range.

9. The method of claim 7 wherein adjusting the amount of fresh air based on the second temperature of the exhaust gas includes, as the second temperature of the exhaust gas increases beyond a threshold, increasing the amount of fresh air in the purging gas mixture.

10. The method of claim 9 further comprising, adjusting the threshold responsive to a hydrocarbon load of the hydrocarbon retaining system.

11. The method of claim 9 further comprising, adjusting the threshold responsive to an air/fuel ratio of the exhaust gas.

12. The method of claim 11 wherein adjusting the threshold responsive to the air/fuel ratio of the exhaust gas includes, as an oxygen content of the exhaust gas increases, reducing the threshold.

13. The method of claim 6 wherein the first and second hydrocarbon traps include zeolite.

14. The method of claim 6, wherein the hydrocarbon trap assembly has a plastic housing.

15. The method of claim 6 further comprising, during the hydrocarbon storing, detecting degradation of the hydrocarbon trap assembly in response to a temperature of exhaust gas being below a predetermined threshold.

16. The method of claim 15 wherein the temperature of exhaust gas includes a temperature gradient of the exhaust gas.

* * * * *